March 13, 1934.　　　M. A. SMITH　　　1,951,111
TREATMENT OF HUBS OF CAR WHEELS
Filed Nov. 27, 1929
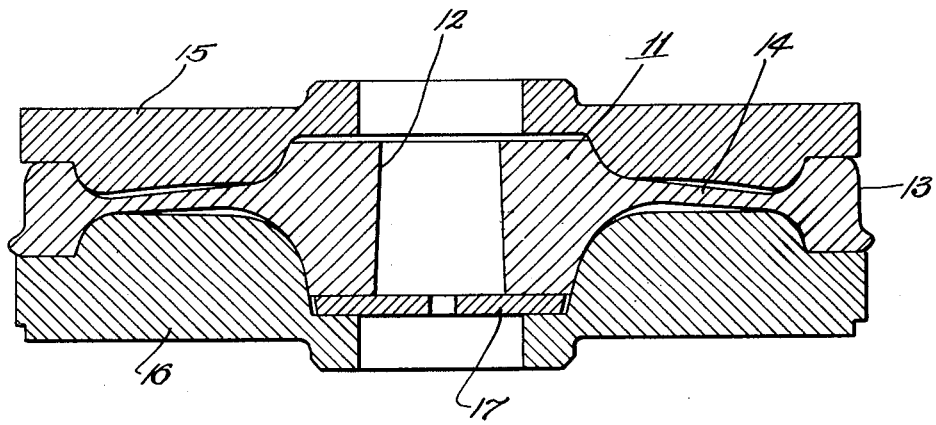
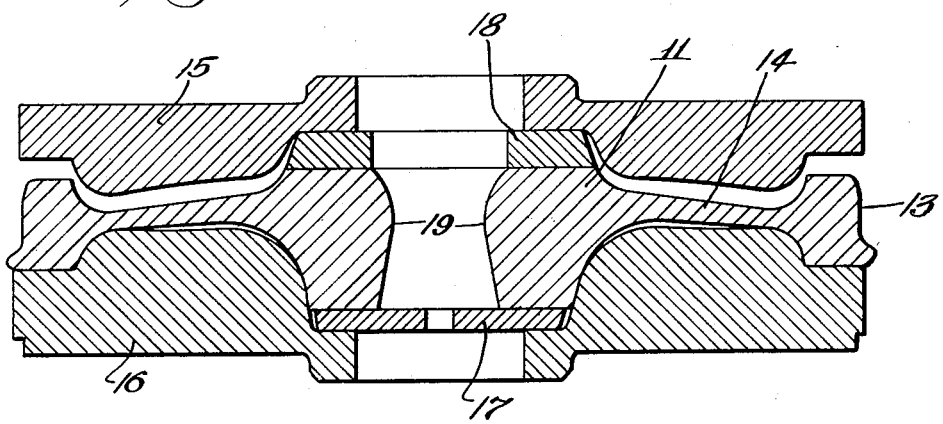
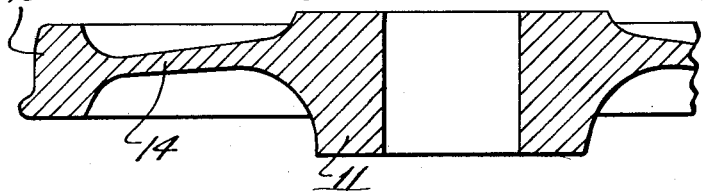
Inventor:
Melton A. Smith
John C. Carpenter
Atty:-

Patented Mar. 13, 1934

1,951,111

UNITED STATES PATENT OFFICE 1,951,111

TREATMENT OF HUBS OF CAR WHEELS

Melton A. Smith, Pittsburgh, Pa., assignor to Edgewater Steel Company, Pittsburgh, Pa., a corporation of Pennsylvania Application November 27, 1929, Serial No. 410,106

10 Claims. (Cl. 29—168)

This invention relates in general to the manufacture of car wheels and has for its object the provision of a new process or method which will provide a car wheel of increased strength and independently of this one having a hub of increased strength and increased capacity to resist and/or sustain the forces and stresses resulting from the forcing of the car wheel upon its axle.

A principal object of the invention is the provision of a car wheel of increased strength. The invention contemplates the manufacture of rolled steel car wheels by a new process or method which will reduce the internal stresses in the plate and between the plate and hub portions produced in the cooling of the wheel.

Car wheels in accordance with the usual practice are bored through the hub opening to an accurate diameter slightly smaller than the diameter of the axle upon which the wheel is to be positioned for service. The car wheel so constructed is forced upon the axle end under heavy pressure, which pressure, even under careful control, has had a tendency to burst or fracture the hub, particularly where the thickness of the walls of the hub is relatively great with respect to the diameter of the bore.

In the cooling of a rolled steel wheel after rolling, the metal, of course, contracts on all dimensions.

Rolled steel car wheels are usually finish bored through the hub and the axle is then turned to a certain number of thousandths of an inch larger than the bore diameter in the hub. The wheel is pressed onto the axle with a hydraulic press, a careful record being made of the pressure which is required to press the wheel on. This pressure tends to stretch the material surrounding the bore of the wheel. In a wheel with an ordinary or fair sized hub, the walls are thin and there is relatively little difficulty in making the wheels sufficiently strong to withstand this pressure. However, in large hub wheels the thickness of the walls of the hub in comparison with its bore is much greater and not infrequently these wheels are not sufficiently strong to resist the bursting pressure needed to mount them on the axis. In analyzing this condition, it is apparent that the additional metal produces a weakness and it would, therefore, seem that this must be because, in cooling down after manufacture, the additional metal in the hub furthest away from the bore is in compression, producing an actual tension in the metal of the hub next to the bore. It is a well known fact that in thick walled cylinders the formula that is used for calculating the strength of the cylinder is not applicable to the calculation of the strength of thin wall cylinders. It is also well known that it is more easily possible to go beyond the elastic limit, starting a crack in the inside of the cylinder before the metal in the outside of the cylinder is strained to a point where it is doing any work in assisting the metal on the inside to resist the stress. It is believed that this is occasioned by the circumstance that, after cooling, tension exists in the material surrounding the bore. My invention contemplates treatment of the wheel after the car wheel is formed to remove the tension produced by the cooling of the wheel and to arrange the material about the hub opening in compression. While the invention relates perhaps more particularly to the formation of car wheels of relatively thick hubs, it will be, of course, apparent that it has valuable application in car wheels having thinner hubs.

The invention has for a principal purpose the provision of a car wheel adapted inherently to withstand increased pressure in assembling it upon the axle end.

A further important object of the invention is the provision of a process or method for manufacturing rolled steel car wheels which will produce a car wheel having a hub of greater strength and which will not require alteration of the steps of manufacture at present employed nor the provision of special equipment for its practice.

Numerous other objects and advantages of the invention will be apparent as it is better understood from the following description, which, taken in connection with the accompanying drawing, discloses a preferred embodiment thereof.

Referring to the drawing:

Figure 1 is a section taken through the truing dies heretofore employed in the manufacture of rolled steel car wheels;

Fig. 2 is a similar section showing the upsetting of the hub in accordance with the at present preferred sequence of steps of this invention; and Fig. 3 is a similar view showing the car wheel after upsetting and after reaming to receive the axle.

For the purpose of illustrating my present invention, the drawing shows a car wheel comprising the usual hub 11 having an axial center or bore 12, a flanged rim 13 and an integral connecting plate or web 14. Since the wheel may be brought to this form by any usual preferred process of rolling, no particular description is thought necessary. The wheel in this form is placed within dies 15 and 16 which give it its final truing and provide the desired amount of dish. If desired, a lower bearing plate 17 may be provided in the die 16.

My invention contemplates the compression of the hub to relieve both the tension set up in the cooling of the wheel and to best adapt the hub portion to withstand the stretching and bursting stresses of the assembly upon the axle. To this end, I place a head plate 18 upon the top of the hub in the dies 15 and 16, or in other appropriate dies, and compress or upset the hub axially, forcing some small amount of the metal in the bore 12, as may be seen at 19. Thereafter, the hub is reamed to desired dimension, as may be seen in Fig. 3, and is ready for assembly upon the axle. In upsetting or otherwise compressing the metal of the hub, the outer hub portions are subjected to a compression particularly against the plate and have a tendency to expand. This relieves any stresses that may have been created in the cooling between the plate or web of the wheel and the hub and relieves also stretching stresses or tension in the plate or web itself. The entire wheel is therefore stronger to resist side or lateral thrust and impact.

The upsetting or compression of the hub is accomplished at a relatively low temperature, i. e. a temperature materially below that at which a car wheel is rolled in the forging operation, preferably generally in the neighborhood of 1500° F. The forging temperature at which the wheel is rolled decreases of course during the rolling and if after the wheel is fully formed it is still too hot, it should be allowed to cool somewhat before the hub is upset. This is in order that the tension produced about the hub opening in the cooling of the wheel may be relieved and the material be placed under compression.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of manufacturing car wheels, which comprises, first forming the wheel with a central hub opening, cooling the wheel below forming temperature, thereafter compressing the metal about the hub opening, and reaming said hub opening to desired diameter.

2. The method of manufacturing car wheels, which comprises, first forming the car wheel with a central hub opening, cooling the wheel below forming temperature, thereafter extruding the metal of the hub into said opening to relieve tension adjacent said hub opening and place the material under compression, and reaming said hub opening to desired diameter.

3. The method of manufacturing car wheels, which comprises, rolling the car wheel to completed form with a central bore in the hub, cooling the wheel below rolling temperature, and compressing the metal about said bore to relieve tension and place the material under compression.

4. The method of manufacturing car wheels, which comprises, forming the wheel, cooling the wheel below forming temperature, and thereafter compressing the metal of the hub to relieve stresses between the hub and plate part of the wheel.

5. The method of manufacturing car wheels, which comprises, first forming the wheel, cooling the wheel below forming temperature, then compressing the metal about the hub opening, and then boring the hub opening to remove metal extruded into said opening.

6. The method of manufacturing car wheels, which comprises, first rolling the wheel to provide a finished rim, a plate, and a hub, and thereafter axially compressing said hub to relieve stresses between the hub and plate parts of the wheel.

7. The method of manufacturing car wheels, which comprises, first rolling the wheel to provide a finished rim, a plate, and a hub, and thereafter axially compressing said hub to relieve the bore of said hub from tension.

8. The method of manufacturing car wheels, which comprises, first rolling the wheel to provide a finished rim, a plate, and a hub, and thereafter axially compressing said hub to place the material adjacent the bore of said hub under compression.

9. The method of manufacturing car wheels, which comprises forging a car wheel to substantially finished shape and thereafter forcing the structure of the inner portion of the hub into compression and the outer portion of the hub into tension, reinforcing the inner portion.

10. The method of manufacturing car wheels which comprises forcing a car wheel to substantially finished shape and at forging temperatures and thereafter forcing the structure of the inner portion of the hub into compression at a temperature below forging temperature.

MELTON A. SMITH.